United States Patent [19]

McKay

[11] Patent Number: 4,846,275

[45] Date of Patent: Jul. 11, 1989

[54] RECOVERY OF HEAVY CRUDE OIL OR TAR SAND OIL OR BITUMEN FROM UNDERGROUND FORMATIONS

[76] Inventor: Alex S. McKay, 1751 E. Reno Ave. - Apt. 233, Las Vegas, Nev. 89119

[21] Appl. No.: 152,933

[22] Filed: Feb. 5, 1988

[51] Int. Cl.$^4$ .................. E21B 43/24; E21B 43/22
[52] U.S. Cl. .................. 166/272; 166/267; 166/275; 166/303
[58] Field of Search .......... 166/266, 267, 271, 272, 166/275, 303; 299/4, 5

[56] References Cited

U.S. PATENT DOCUMENTS

| | | | |
|---|---|---|---|
| 3,221,813 | 12/1965 | Closmann et al. | 166/271 |
| 3,279,538 | 10/1966 | Doscher | 166/271 X |
| 3,379,250 | 4/1968 | Matthews et al. | 166/271 |
| 3,396,791 | 8/1968 | Van Meurs et al. | 166/272 |
| 3,706,341 | 12/1972 | Redford | 166/272 |
| 3,802,508 | 4/1975 | Kelly, deceased et al. | 166/272 |
| 3,913,671 | 10/1975 | Redford et al. | 166/272 |
| 4,265,310 | 5/1981 | Britton et al. | 166/272 X |
| 4,516,636 | 5/1985 | Doscher | 166/272 |

OTHER PUBLICATIONS

T. M. Doscher, "Enhanced Recovery of Crude Oil", American Scientist, vol. 69, Mar.-Apr. 1981, pp. 193-200.
Saner and Patton, "CO$_2$ Recovery of Heavy Oil: Wilmington Field Test", Journal of Petroleum Technology, Jul. 1985, pp. 769-776.
Carrigy, "New Production Techniques For Alberta Oil Sands", Science, vol. 234, Dec. 1986, pp. 1515-1518.

Primary Examiner—Bruce M. Kisliuk
Attorney, Agent, or Firm—Cooper & Dunham

[57] ABSTRACT

Heavy crude oil or tar sand oil or bitumen is recovered from an underground formation containing the same by introducing into said formation via an injection well or conduit a hot alkaline aqueous fluid so as to bring about the movement or migration or stripping of said heavy crude oil or tar sand oil or bitumen from said formation into said hot alkaline aqueous fluid at the interface between said hot alkaline aqueous fluid and said heavy crude oil or tar sand oil or bitumen-containing formation as said hot alkaline aqueous fluid moves along within said formation from said injection well or conduit to a production well or conduit for the recovery of the resulting produced heavy crude oil or tar sand oil or bitumen from said formation as an emulsion via said production well or conduit.

46 Claims, 3 Drawing Sheets $Q$ = PRODUCTION RATE
$\Delta P = P_I - P_P$ INJECTION PRESSURE MINUS PRODUCTION PRESSURE
$t$ = THICKNESS OF ACTIVE RESERVOIR
i.e., THICKNESS OF ZONE WITH FLUID MOVEMENT $Q$ = PRODUCTION RATE
$\Delta P = P_I - P_P$  INJECTION PRESSURE MINUS PRODUCTION PRESSURE
$t$ = THICKNESS OF ACTIVE RESERVOIR i.e., THICKNESS OF ZONE WITH FLUID MOVEMENT

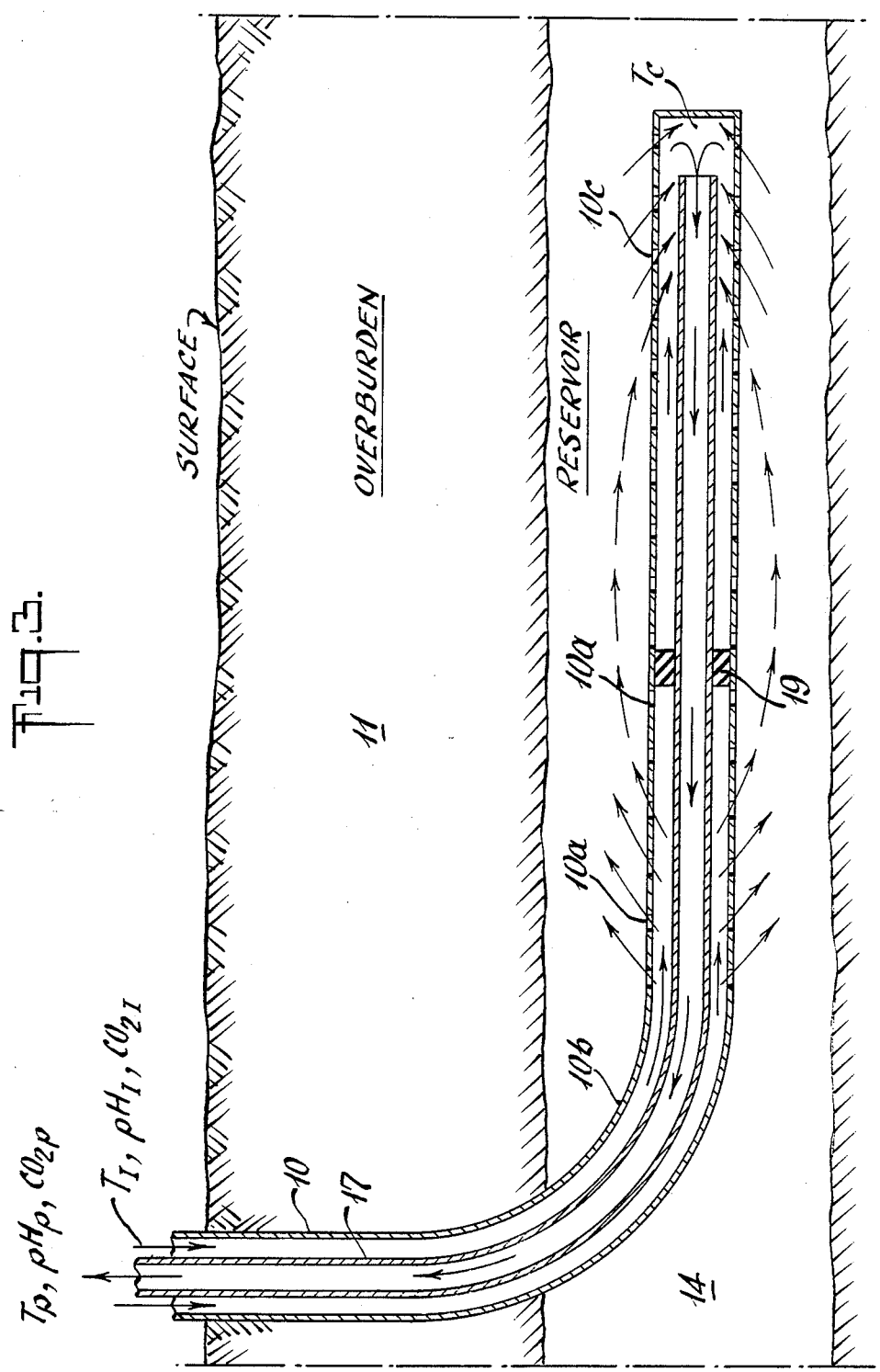

RECOVERY OF HEAVY CRUDE OIL OR TAR SAND OIL OR BITUMEN FROM UNDERGROUND FORMATIONS

BACKGROUND OF THE INVENTION

This invention relates to the recovery of heavy crude oil and tar sand oil (bitumen) from underground formation. Locations exist throughout the world with very large reserves of heavy crude oil and tar sand oil but as yet the recovery of heavy crude oil and tar sand oil or bitumen therefrom has not been commercially successful. For example, vast resources of bitumen are present in the oil sands of Northern Alberta, Canada and various techniques have been developed and employed to exploit these resources. As yet, however, the techniques employed have not been completely satisfactory.

Heavy crude oil and tar sand oil (bitumen) are petroleum or petroleum-like liquids or semi-solids naturally occurring in porous media. Tar sand is also called oil sand and bituminous sand. These materials, heavy crude oil and tar sand oil, may be characterized by viscosity and density. The measure of viscosity has been proposed and used to define heavy crude oil and tar sand oil and density (API gravity) has been proposed and used to define such materials where viscosity measurements are not available. Heavy crude oil has been defined as having a gas-free viscosity of 100–10,000 mPa.s (centipoise) inclusive at original reservoir temperature or a density of 934 kg/m$^3$ (20° API gravity) to 1000 kg/m$^3$ (10° API gravity) inclusive at 15.6° C. (60° F.) at atmospheric pressure. Tar sand oil has been defined as having a gas-free viscosity greater than 10,000 mPa.s at original reservoir temperature or a density greater than 1000 kg/m$^3$ (less than 10° API gravity) at 15.6° C. (60° F.) at atmospheric pressure.

The production and recovery of heavy crude oil from underground formations containing the same has long been practiced but, as indicated hereinabove, the results have not been completely satisfactory, see for example U.S. Pat. Nos. 1,651,311, 2,813,583, 2,875,831, 3,107,726, 3,279,538, 3,490,532, 3,913,671, 4,114,690, 4,223,730, 4,441,555, 4,475,592, 4,487,262, 4,523,642 and 4,660,641. Of interest also with respect to the production of heavy crude oil and tar sand oil, reference is made to the article "Enhanced Recovery of Crude Oil" by T. M. Doscher, *American Scientist,* Vol. 69, March-April 1981, pp. 193–200, the article entitled "CO$_2$ Recovery of Heavy Oil: Wilmington Field Test" by W. B. Saner and J. T. Patton, *Journal of Petroleum Technology,* July 1986, pp. 769 ∝ 776, and the article entitled "New Production Techniques for Alberta Oil Sands" by M. A. Carrigy, Science, Vol. 234, Dec. 19, 1986, pp. 1515–1518. The disclosures of the above-referred patents and articles are herein incorporated and made part of this disclosure.

It is an object of this invention to provide a method for the recovery of heavy, difficult-to-recover petroleum and bituminous materials from porous underground formations containing the same.

It is another object of this invention to provide an improved technique for the recovery of tar sand oil or bitumen from underground formations containing the same, such as recovery of tar sand oil from the oil sands located in Northern Alberta, Canada, the so-called Canadian oil sands.

It is yet another object of this invention to provide an improved technique employing readily available materials, such as water and caustic, for the recovery of tar sand oil from tar sands and the like or for the recovery of heavy crude oil or bituminous materials present in underground porous formations.

How these and other objects of this invention are achieved will become apparent with reference to the accompanying disclosure and drawings wherein:

FIG. 1 graphically illustrates the variation of the viscosity of bitumen-water emulsions with oil content;

FIG. 2 illustrates a technique in accordance with this invention employing a separate injection well and a separate production well for the recovery of tar sand oil from underground formations containing the same; and wherein:

FIG. 3 illustrates another technique in accordance with this invention employing concentric injection and production wells wherein the wells are horizontally slanted or directed into and along a heavy crude oil or tar sand oil or bitumen-containing underground formation for the recovery of heavy crude oil, butumen or tar sand oil therefrom.

SUMMARY OF THE INVENTION

Heavy crude oil or tar sand oil or bitumen is recovered from an underground formation containing the same by introducing into said formation via an injection well an aqueous fluid to establish a fluid communication path from said injection well through said formation to a production well from which the injected aqueous fluid is produced and recovered together with heavy crude oil or tar sand oil or bitumen. After establishment of an aqueous fluid communication path within and through said formation from said injection well to said production well with recovery therefrom of the injected aqueous fluid, the temperature of the injected aqueous fluid is increased. Desirably, also, the pH of the injected relatively hot aqueous fluid is also increased.

With the increase of pH and temperature of the injected aqueous fluid, such as hot water or a mixture of steam and water or low quality steam, and as the hot injected aqueous fluid moves through said formation from the injection well to the production well, movement or migration or stripping of heavy crude oil or tar sand oil or bitumen from the formation into the aqueous fluid communication path occurs with the result that there is recovered at the production well resulting produced and recovered heavy crude oil or tar sand oil or bitumen as an emulsion, preferably oil-in-water emulsion, along with the injected aqueous fluid, at the production well.

FIG. 1 shows the viscosity of bitumen-water emulsions as a function of the bitumen content or oil cut at a temperature of 100° C. When the oil cut is 0% the viscosity is the viscosity of water and gradually increases slowly as the oil cut increases to around 30%. A greater than 70% water phase is adequate to provide the continuous external water phase that is a characteristic of the oil-in-water (O/W) emulsion. At the other extreme, at 100% oil cut, the viscosity is the viscosity of water-free bitumen and this viscosity increases as the water content increases to about 40% or 60% oil cut point, a water-in-oil emulsion (W/O) with water contained in a continuous bitumen phase. The dashed line covering the oil cut interval from 30% to 60% covers a transition zone which contains both O/W and W/O emulsions. It would be advantageous, therefore, to maintain the oil cut a little below 30% to avoid formation plugging and achieve a satisfactory oil cut for as long as possible. This can be done by gradually increasing the amount of emulsification additive or surfactant in the injected aqueous fluid or water to offset the normal decline of the oil cut as the recovery project matures.

Further, FIG. 1 markedly demonstrates the very low viscosity of the O/W emulsion as compared to bitumen at 100° C. It would be necessary to heat the bitumen to 200° C. to achieve the same effective bitumen viscosity reduction to that of the O/W emulsion.

After the thus-produced heavy crude oil or tar sand oil or bitumen is recovered from the formation via the production well, the thus-produced heavy crude oil or tar sand oil or bitumen is recovered from the produced oil and water emulsion. If desired, a minor portion of the thus-produced emulsion containing heavy crude oil or tar sand oil or bitumen from the production well may be recycled to the injection well for injection into the formation along with the injected hot aqueous fluid. If desired, the produced emulsion from the production well can be broken and the aqueous fluid or water phase recovered and re-introduced into the formation via the injection well with the hot aqueous fluid.

Also, if desired, there may be added to the hot aqueous injected fluid, hot water and/or low quality steam, a surfactant, such as a petroleum sulfonate, to enhance the formation of O/W emulsions and movement or migration or stripping of the heavy crude oil or tar sand oil or bitumen from the formation into the aqueous fluid communication path moving through the formation from the injection well to the production well. In some instances it may be observed that naturally occurring surfactants within the formation are picked up by the injected aqueous fluid along with the produced heavy crude oil or tar sand oil or bitumen and dissolved in the aqueous fluid, or in the aqueous phase of the produced emulsion. The thus-produced and recovered aqueous phase, as indicated hereinabove, can then be recycled to the formation via the injection well with or without, as may be preferred, or required, additional surfactant material, such as petroleum sulfonates.

Additionally, desirably after an active fluid communication path has been established within the formation from the injection well to the production well and before, during or after the pH of the injected aqueous fluid has been increased to an alkaline value, such as a pH in the range 9-13, e.g. about a pH of 12, carbon dioxide ($CO_2$) is introduced into the formation via the injection well along with the injected aqueous fluid to assist in the removal and production of the heavy crude oil or tar sand oil from the formation.

DETAILED DESCRIPTION OF THE INVENTION

In carrying out the production and recovery of heavy crude oil or tar sand oil or bitumen from an underground formation containing the same in accordance with the practices of this invention, and after establishment of an aqueous fluid communication path through and along the formation from the injection well to the production well, hot aqueous fluid is introduced into the formation via the injection well for recovery, after movement through the formation, at the production well. If an aqueous fluid communication path already exists within the formation, a not unexpected occurrence since it sometimes happens a portion of the formation is water saturated and can therefore be used as an already established fluid communication path within the formation hot injected fluid can be directly injected at said formations via said injection well and produced via said production well. Upon gradual increase in temperature of the formation traversed by the injected hot aqueous fluid from the injection well to the production well, movement of the heavy crude oil or tar sand oil or bitumen from the formation into the hot aqueous fluid moving through the formation occurs with the resulting commencement of production of the heavy crude oil or tars and oil or bitumen from the formation as an emulsion with the injected aqueous fluid. The thus-produced heavy crude oil or tar sand oil or bitumen is recovered, usually at the surface, from the emulsion produced and recovered at the production well.

During this operation, the movement of the hot aqueous fluid through the formation, heavy crude oil or tar sand oil or bitumen migrates from the formation into the hot aqueous fluid path through the interface between the hot aqueous fluid communication path and the formation containing the heavy crude oil or tar sand oil or bitumen. In effect, as the hot aqueous fluid moves along the aqueous communication path established within the formation it sweeps along the heavy crude oil or tar sand oil or bitumen of the formation released at the interface into the hot aqueous fluid communication path for recovery at the production well. As a result of this operation the hot aqueous fluid communication path moves downwardly within the formation increases in size or cross section or volume within the formation while at the same time tending to increase the formation temperature to the temperature of the injected aqueous fluid. The pressure drop required to move a given amount of aqueous fluid from the injection well to the production well tends to decrese because of the increased permeability and enlargement of the aqueous fluid communication path from the injection well to the production well within the formation upon or the continued injection of hot aqueous fluid into the formation. It is possible for a given pressure drop between the injection well and the production well to move a larger quantity of aqueous fluid through the formation, thereby tending to increase the production of heavy crude oil and tar sand oil or bitumen from the formation. Because of the downward movement of the interface between the injected relatively hot aqueous phase and the unrecovered bitumen portion of the formation, the practice of this invention is particularly applicable to the recovery of unrecovered bitumen or heavy oil from a formation which has been treated with injected steam which eventually tend to bypass from the injection well to the production well after a period of time along the upper portion of the formation leaving behind in the lower portion a substantial amount of unrecovered oil. This oil could be recovered by employing hot aqueous fluid (water) injection in accordance with this invention to sweep out the unrecovered oil from the lower portion of the formation.

Initially, the amount of heavy crude oil or tar sand oil or bitumen recovered from the formation as an emulsion via the injection well may amount from less than about 1% to about 3 to 5% by volume or weight of the water-oil emulsion fluids produced from the formation via the production well. Upon continued production, due to increase in the permeability and enlargement of the aqueous fluid communication path within the formation, for a given pressure drop between the injection and production wells, increased amounts of hot aqueous fluid can be introduced into the formation with resulting increase of produced heavy crude oil or tar sand oil or bitumen. It is desirable, however, that the produced fluids from the production well have a heavy crude oil or tar sand oil or bitumen content of less than about 30% by volume or weight. When the oil cut or the amount of oil in the produced aqueous fluids from the production well approaches or exceeds 30% by volume or weight, plugging of the formation, with resulting reduced permeability at the production well and resulting decreased productivity tends to occur. Water-in-oil emulsions which might likely occur at high oil cuts, are greater than about 30% oil in the produced fluids, which tend to plug or block off the formation at the production well with resulting loss in production. Accordingly, it is preferred to maintain the produced liquids at the production well at a level such that the oil content thereof does not bring about plugging of the formation at the production well, such that the oil content of the produced fluids is below about 30%.

In the establishment of an aqueous fluid communication path from the injection well to the production well or in the utilization of a pre-existing aqueous fluid communication path or substantially water saturated level or stratum already existing between the injection well and the production well, aqueous fluid, such as water, is introduced into the formation via the injection well and recovered from the formation at the production well, thereby establishing an active aqueous fluid communication path within the formation between the injection well and the production well. Thereupon the temperature of the injected aqueous fluid or liquid is increased, such as to a temperature in the range 60°–180° C., more or less, such as a temperature in the range from about 90° C. to about 130° C. Desirably, at the same time as the temperature of the injected aqueous fluid is increased, the pH of the fluid is increased by adding thereto a suitable akaline agent, such as caustic soda, NaOH. Additionally, a surfactant to promote the production of oil from the formation into the injected aqueous fluid and/or the formation of oil-water emulsions, such as oil-in-water emulsions, a surfactant such as a petroleum sulfonate, e.g. sodium alkylbenzene sulfonate or other surfactant, is introduced into the formation, such as along with the hot aqueous fluid, to assist the movement at the interface of the heavy crude oil or tar sand oil or bitumen into the injected aqueous fluid moving within the formation between the injection well and the production well.

With respect to the use of an alkaline agent in the aqueous fluid to increase its pH, particularly the pH or the injected hot aqueous fluid, sodium hydroxide is usually preferred. This alkaline agent, however, can be supplemented by the addition of other alkaline agents, such as sodium carbonate, ammonia, ammonium hydroxide, ammonium carbonate and alkaline acting alkali-metal phosphates. Desirably, gaseous carbon dioxide is also introduced into the formation via the injection well. Sufficient alkaline agent, e.g. caustic, NaOH, is introduced into the aqueous fluid traversing the formation in contact with the heavy crude oil or tar sand oil or bitumen from the injection well to the production well is employed to increase and/or maintain the pH of the aqueous fluid traversing the formation to a value in the range about 7–13, more or less, such as in the range 9–12, more or less, particularly as measured at the production well. Also, a sufficient amount of surfactant is employed, such as a petroleum sulfonate, along with the injected aqueous fluid to enhance or to increase the migration and movement of the oil into the aqueous fluid communication path at the interface containing formation to improve and to better mobilize the movement of the heavy crude oil exposed at the interface into the aqueous fluid communication path and also to maintain the oil cut of oil-in-water emulsions at desired levels. Usually an amount of surfactant in the range from about 1–1000 ppm by weight in the aqueous fluid or up to about 2–5% by weight of the aqueous fluid is sufficient. When surfactant is added, some of the added surfactant is usually recovered in the produced fluids and can be recycled to the formation with the produced aqueous fluid recovered at the production well to the injection well for reintroduction into the formation.

DESCRIPTION OF THE DRAWINGS

Referring now to the drawings, particularly FIG. 2, which illustrates one embodiment of the practices of this invention employing a substantially vertical separate injection well and a substantially vertical, separate production well, there is illustrated therein injection well casing 10 which vertically penetrates overburden 11 and impermeable rock or shale 12 into and through a heavy crude oil or tar sand oil or bitumen-containing formation 14 and is bottomed in impermeable rock or shale 15. Perforations 10a are provided in injection well casing 10 for the introduction into the formation via injection tubing 16 of the aqueous liquid or fluid, such as water, hot water, low quality steam and combinations thereof along with caustic surfactant and/or carbon dioxide as desired or required in the practices of this invention.

As illustrated, the injected aqueous fluid moves along the top or upper portion of formation 14 and establishes a fluid communication path 14a through formation 14 from injection well 10 to production well 17. The aqueous fluid introduced into the formation via injection well 10 enters production well casing 17 via perforations 17a of production well casing 17 and is recovered from production well casing 17 via production tubing 18. As the injected fluid moves from injection well casing 10 to production well casing 17, it sweeps along the top or upper portion of formation 14 and takes with it the heavy crude oil or tar sand oil or bitumen within formation 14 at its interface or contact with the aqueous fluid communication path 14a, thereby enlarging aqueous fluid communication path 14a within formation 14 and increasing the permeability of formation 14, such as path 14a, in that portion thereof swept by the injected aqueous liquid.

Figure 1:
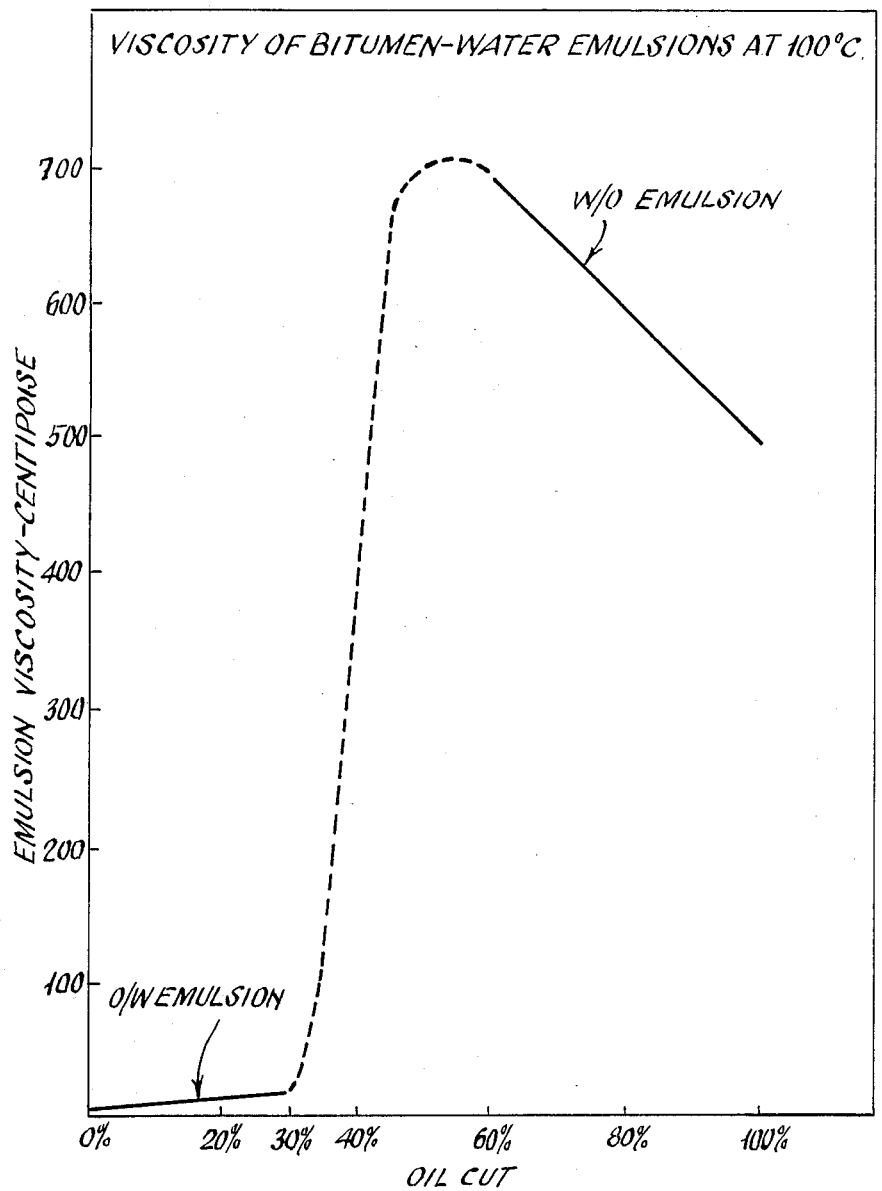

Upon continued introduction of aqueous liquid into the formation via well casing 10 and production of the aqueous liquid along with the produced oil via production well 17, the high permeability, substantially water saturation zone of formation 14, i.e. path 14a, increases and its interface moves downwardly within formation 14 to uncover and contact additional formation oil which is then swept into and moved along the formation to production well casing 17.

Because of the resulting increased size or crosssection and permeability of the formation through which the aqueous liquid passes during the injection thereinto of the aqueous fluid, as compared with the permeability of the formation containing the in situ substantially immobile heavy crude oil or bitumen, the pressure drop between the injection well and the production well for a given rate of injectin fluid tends to decrease. Accordingly, the injection of increased amounts of fluid is possible while substantially not increasing the initial pressure differential between the injection and production wells or without unduly increasing the pressure differential between the injection well and the production well for a given production rate of oil at the production well. It is desirable, however, not to increase the oil content of the produced oil in the fluids recovered at the production well to a value greater than about 30% by weight or volume oil in the oil-water emulsion produced via production well 17 to avoid blocking or plugging of the formation around production well 17 with the relatively high viscosity formation oil which tends to form viscous water-in-oil emulsions at an oil cut of about 30%.

As will be apparent substantial quantities of oil present in the formation can be produced even when the oil cut in the produced liquids from production well 17 is less than 30%, such as a production fluid which has an oil cut of 20%, more or less. It should be apparent, therefore, that production rates of the produced oil can be substantially increased without substantially increasing the pressure drop between the injection well and the production well because of the increased formation permeability brought about as the aqueous fluid communication path between the injection and production wells is increased in size within the formation.

Referring again to FIG. 2, the temperature $T_I$ of the injected aqueous fluid is suitably in the range 60°–180° C. and the injected aqueous fluid has a pH, in the alkaline range, such as up to about 13, e.g. in the range 9–12. As indicated, carbon dioxide $CO_{2I}$ is also usefully introduced into formation 14 via injection well 10 and casing 16 along with the aqueous liquid which usually comprises low quality steam and/or hot water. The fluids introduced into formation 14 via injection well 10 and casing 16 are introduced at a pressure $P_I$ sufficient to drive the injected aqueous fluids or liquids through formation 14 along path 14a from injection well 10 to production well 17 for recovery via production tubing 18. The amount or rate of production Q of the produced fluids, as indicated, depends upon the amount and rate the aqueous fluid is introduced into formation 14 via injection well 10. The fluids produced from formation 14 via production well 17 via production casing 18 are at a temperature $T_p$ usually in the range about 10°–80° C. lower than the injection temperature $T_I$. Also, the pH, $pH_p$, of the produced fluid is about the same, usually less than the pH, $pH_I$, of the injected aqueous fluids; reduction in pH of the injected fluids occurs as the fluids move through formation 14 from production well 10 to production well 17. Similarly, the pressure of the carbon dioxide $CO_{2P}$ produced from production well 17 is substantially less than the pressure of the introduced $CO_2$, $CO_{2I}$, at injection well 10. Further, the pressure $P_p$ of the produced fluids recovered from formation 14 via production well 17 and production casing 18 is substantially less than the pressure $P_I$ of the injected fluids entering formation 14 via injection well 10.

As indicated hereinabove, in the practices of this invention, once an aqueous fluid communication path 14a has been established through the formation from injection well 10 to production well 17 with a resulting differential $P_I$-$P_p$ therebetween, it is desirable to maintain this pressure differential $\Delta P$ substantially constant despite the fact the permeability of formation 14 through the aqueous liquid communication path becomes increased. A substantially fixed or constant predetermined $\Delta P$ is established and maintained by increasing the amount of injected fluid introduced into formation 14 via injection well 10 with resulting increased production Q at projection well 17. This increased production Q of the produced fluid via production well 17 is achieved despite the fact communication path 14a is enlarged with increased permeability by increasing the rate of introduction of the injected fluids while maintaining the pressure differential between injection well 10 and production well 17 constant. It is possible therefore to increase the rate of production Q of the recovered oil from formation 14 without unduly increased fluid injection pressure $P_I$. It is desirable, however, during these operations to monitor the oil cut or oil content of the produced fluids leaving formation 14 via production well 17 and production casing 18 to avoid plugging formation 14 at production well 17 due to the formation of a plug of immobile high viscosity oil in formation 14 surrounding perforations 17a of production well 17. A thus-formed plug of high viscosity oil tends to occur when the produced oil cut is about 30% and the oil therein to be in the form of the more viscous water-in-oil emulsion rather than in the form of the more mobile oil-in-water emulsion.

Referring now to FIG. 3 wherein similar reference figures have been employed to denote similar items, injection well casing 10 penetrates overburden 11 and substantially upon entering formation 14 injection well casing 10 is curved or slanted horizontally at 10b within formation 14. Perforations 10a are provided by injection well casing 10 for the introduction of aqueous liquids as described hereinabove into formation 14.

The resulting injected aqueous fluids together with the produced formation fluids, such as heavy oil, are recovered through perforations 10c provided in injection well 10 at the far end thereof within formation 14. As the injected aqueous fluid leaves injection well 10 via perforations 10a, the injected aqueous fluid moves along and within formation 14 and takes with it the heavy crude oil or tar sand oil or bitumen within formation 14 in contact therewith and is recovered from formation 14 via perforations 10c. These fluids entering perforations 10c of injection well 10 are recovered via production tubing 17 concentrically disposed substantially along the length of injection well casing 10, as illustrated.

In operation, when injected fluids are introduced into formation 14 via injection well 10 and perforations 10a, which are disposed along the horizontal section of injection well 10 within formation 14, the injected fluids move into formation 14 via the injection well perforations 10a and sweep along the formation and again re-enter injection well 14 via perforations 10c and are recovered via production well tubing 17, as illustrated. Concentrically disposed injection casing 10 and production tubing 17 within formation 14 permit the ready production of heavy crude oil from formation 14.

The operation of the embodiment of the invention as illustrated in FIG. 3 may be improved or made more versatile by the installation of plug 19 in the annulus between injection well casing 10 and production well tubing 17 so that all the injected liquids introduced into formation 14 enter the formation via perforations 10a at the near end of injection well casing 10 upstream of plug 19 and all the liquids produced from formation 14 are recovered via perforations 10c at the far end of casing 10 downstream of plug 19 for eventual recovery via production well tubing 17. Desirably, the temperature $T_c$ of the produced fluids entering production well 17 tubing is maintained at a temperature in the range 100°–140° C., more or less, preferably about 130° C.

Control of the produced liquid temperature $T_c$ is achieved in accordance with the practices of this invention by varying the temperature $T_I$ of the injected liquids. Desirably, the pH of the produced liquids, $pH_p$ is maintained at a level about 7–13, preferably in the range 7–11. These conditions or values for $T_c$ and $T_p$ and $pH_p$ are also applicable and desirable limitations with respect to carrying out the practices of this invention as illustrated in FIG. 1.

Figure 2:
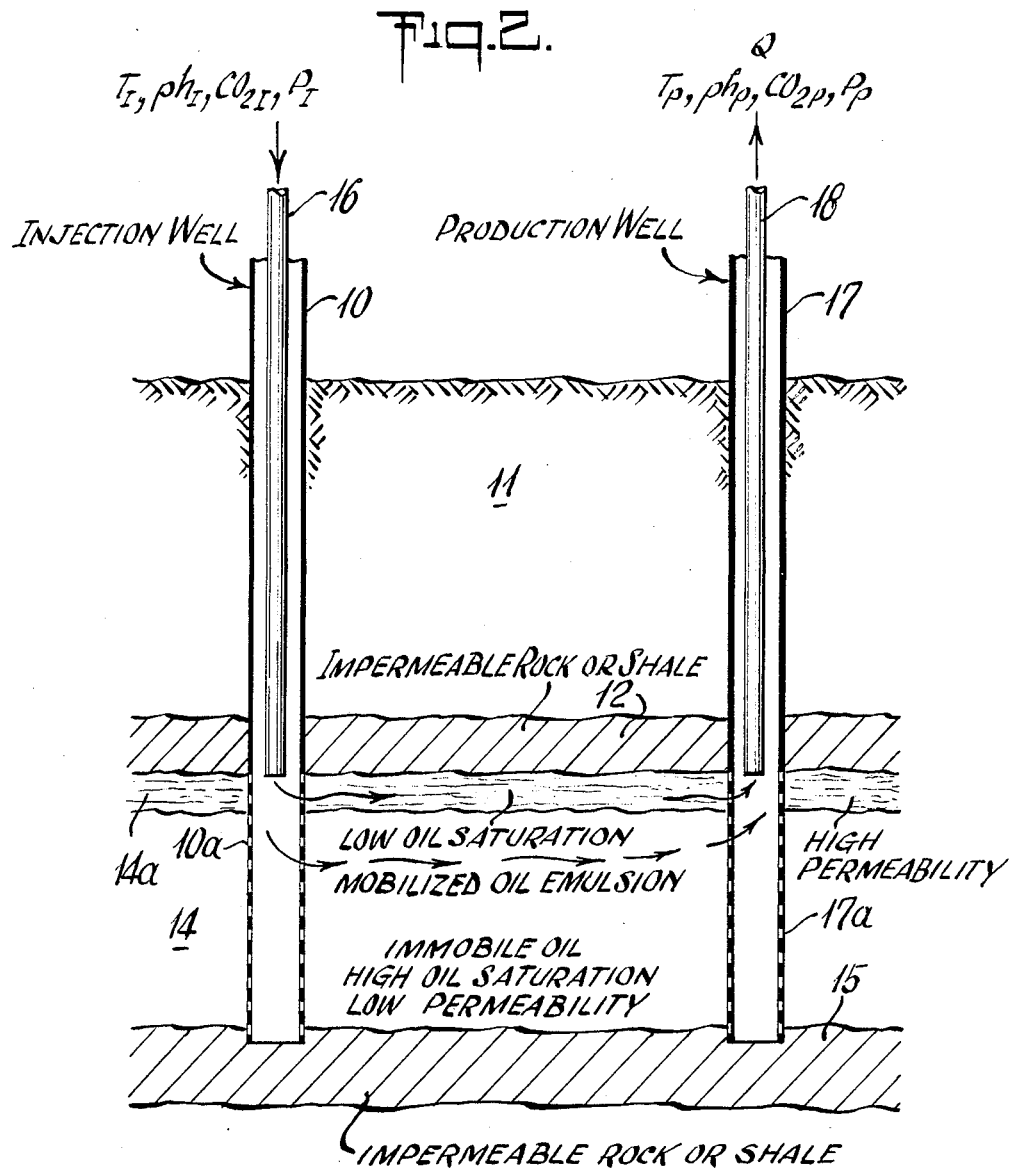

Further, modification of FIG. 2 as another embodiment of this invention would include the utilization of production tubing 17 as injection well tubing with perforations 10a and 10c serving for the recovery of the produced fluids from the formation and introduction of the aqueous fluid into the formation, respectively. In effect, in this embodiment the roles or functions as first described with reference to FIG. 2 of the injection well casing 10 and production well tubing 17 would be reversed, with well casing 10 serving as a production well and tubing 17 serving as an injection well.

Still yet another modification of the embodiment of the invention illustrated in FIG. 3, instead of a single packer 19 there may be employed two packers separated along the length of the annular space between casing 10 and tubing 17 within formation 14. Two packers would serve to isolate or cut off production of the heavy oil from within formation 14 through those perforations 10a of casing 10 along that portion of casing 10 between the spaced apart packers 19.

As will be apparent to those skilled in the art in the light of the foregoing disclosure, many modifications, alterations and substitutions are possible in the practice of this invention without departing from the spirit or scope thereof.

What is claimed is:

1. A method of producing heavy crude oil or tar sand oil or bitumen from an underground formation containing the same, which comprises utilizing or establishing a aqueous fluid communication path within and through said formation between an injection well or conduit and a production well or conduit by introducing into said formation from said injection well or conduit hot water and/or low quality steam at a temperature in the range about 60°–130° C. and at a substantially neutral or alkaline pH to establish or enlarge said aqueous fluid communication path within said formation from said injection well or conduit to said production well or conduit by movement of said introduced hot water or low quality steam through said formation, increasing the temperature of said injected hot water or low quality steam to a temperature in the range about 110°–180° C. while increasing the pH of the injected hot water or low quality steam to a pH of about 10–13 so as to bring about the movement or migration or stripping of said heavy crude oil or tar sand oil or bitumen from said formation substantially into said hot aqueous fluid communication path within said formation and recovering the resulting produced heavy crude oil or tar sand oil or bitumen from said formation as an emulsion containing less than about 30% oil or bitumen from said production well or conduit.

2. A method in accordance with claim 1 wherein said injection well or conduit and said production well or conduit are separated horizontally from each other and substantially vertically penetrate said formation.

3. A method in accordance with claim 1 wherein said injection well or conduit and said production well or conduit are substantially horizontally and concentrically disposed within said formation with an inlet for said injection well or conduit and an outlet for said production well or conduit disposed on the surface above said formation.

4. A method in accordance with claim 1 wherein sodium hydroxide is dissolved in said injected hot water or low quality steam at a temperature in the range 60°–130° C. or at said increased temperature in the range about 110°–180° C.

5. A method in accordance with claim 1 wherein carbon dioxide is introduced into said injected hot water or low quality steam at a temperature in the range about 60°–130° C. or at said increased temperature in the range about 110°–180° C.

6. A method in accordance with claim 1 wherein a surfactant is present in said injected hot water or low quality steam at a temperature in the range 60°–130° C. or at said increased temperature in the range about 110°–180° C.

7. A method in accordance with claim 1 wherein said resulting produced heavy crude oil or tar sand oil or bitumen is recovered as an oil-in-water emulsion.

8. A method in accordance with claim 1 wherein said resulting produced heavy crude oil or tar sand oil or bitumen is recovered as an emulsion containing up to about 30% by volume or weight heavy crude oil or tar sand oil or bitumen.

9. A method in accordance with claim 1 wherein said resulting produced heavy crude oil or tar sand oil or bitumen is recovered as an oil-in-water emulsion having an oil cut or oil content in the range 10 to up to about 30% by weight or volume.

10. A method in accordance with claim 1 wherein said resulting produced heavy crude oil or tar sand oil or bitumen is recovered as a water-in-oil emulsion.

11. A method in accordance with claim 1 wherein said resulting produced heavy crude oil or tar sand oil or bitumen is recovered as a mixture of oil-in-water and water-in-oil emulsions.

12. A method in accordance with claim 1 wherein the pressure differential between the pressure of the hot water or low quality steam introduced into said formation via said injection well or conduit and the pressure at said production well of the resulting produced heavy crude oil or tar sand oil or bitumen produced from said formation is maintained constant while injecting aqueous fluid and recovering the resulting produced heavy crude oil or tar sand oil or bitumen from said formation via said production well or conduit.

13. A method in accordance with claim 12 wherein said pressure differential is maintained constant by increasing the amount of hot water or low quality steam introduced into said formation.

14. A method in accordance with claim 1 wherein a petroleum sulfonate surfactant is introduced into said formation via said injection well along with said hot water or low quality steam at a temperature in the range about 60°–130° C. or at said increased temperature in the range about 110°–180° C.

15. A method in accordance with claim 1 wherein a petroleum sulfonate surfactant is introduced into said formation along with the injected hot water or low quality steam at a concentration therein in the range 1–10,000 ppm by weight.

16. A method in accordance with claim 1 wherein a minor amount of water recovered with the heavy crude oil or tar sand oil or bitumen is reintroduced into said formation via said injection well together with said injected hot water or low quality steam at a temperature in the range about 60°–130° C. or at said increased temperature in the range about 110°–180° C.

17. A method in accordance with claim 1 wherein a minor amount of the recovered heavy crude oil or tar sand oil or bitumen in emulsion form is reintroduced into said formation via said injection well together with said injected hot water or low quality steam.

18. A method in accordance with claim 17 wherein said minor amount is in the range 2–20% by volume of the hot water or low quality steam introduced into said formation via said injection well.

19. A method in accordance with claim 16 wherein said minor amount of water is in the range 2–20% by volume of the hot water or low quality stream introduced into said formation.

20. A method in accordance with claim 1 wherein a surfactant is introduced into said formation along with said hot water or low quality steam at a temperature in the range 60°–130° C. or in the range about 110°–180° C. to enhance the formation and production of said emulsion from said formation via said production well or conduit.

21. A method in accordance with claim 20 wherein said surfactant is introduced into said formation along with said hot water or low quality steam in an amount 1–1000 ppm of said hot water or low quality steam introduced into said formation via said injection well.

22. A method in accordance with claim 1 wherein the produced heavy crude oil or tar sand oil or bitumen from said formation recovered via said production well or conduit comprises in the range about 30% by volume or weight of said emulsion.

23. A method in accordance with claim 1 wherein the produced heavy crude oil or tar sand oil or bitumen from said formation recovered via said production well or conduit comprises about 10–25% by volume or weight of said emulsion.

24. A method in accordance with claim 1 wherein the pressure differential between the pressure of the hot water or low quality steam introduced into said formation at a temperature in the range 110°–180° C. via said injection well or conduit and the pressure of the resulting produced heavy crude oil or tar sand oil or bitumen produced from said formation at said production well or conduit is maintained constant while recovering an increased amount of the resulting produced heavy crude oil or tar sand oil or bitumen from said formation via said production well or conduit.

25. A method in accordance with claim 1 wherein the pressure differential between the pressure of the hot water or low quality steam introduced into said formation via said injection well or conduit and the pressure of the resulting produced heavy crude oil or tar sand oil or bitumen produced is varied or adjusted while recovering a predetermined or fixed amount of the emulsion containing less than about 30% heavy crude oil or tar sand oil or bitumen from said formation via said production well or conduit.

26. A method in accordance with claim 1 wherein the pH of the injected hot water or low quality steam is increased by dissolving in said injected hot water or low quality steam an alkaline acting compound in an amount sufficient to increase the pH of said injected hot water or low quality steam to a value in the range about 9–13.

27. A method in accordance with claim 26 wherein said alkaline compound is selected from the group consisting of ammonia, ammonium hydroxide, ammonium carbonate, sodium hydroxide, sodium carbonate, trisodium phosphate and disodium phosphate.

28. A method in accordance with claim 1 wherein said formation is a Canadian tar sand oil formation.

29. A method of producing heavy crude oil or tar sand oil or bitumen from an underground formation containing the same which comprises utilizing or establishing a fluid communication path through said formation between an injection well or conduit and a production well or conduit in fluid communication within said formation by introducing into said formation via said injection well or conduit an aqueous fluid to establish an aqueous fluid communication path through said formation from said injection well or conduit to said production well or conduit by movement of said introduced aqueous fluid through said formation from said injection well or conduit to said production well or conduit, increasing the temperature of said injected aqueous fluid while increasing the pH of the injected aqueous fluid to a pH in the alkaline range above about 9 to bring about the movement or migration or stripping of said heavy crude oil or tar sand oil or bitumen substantially along the interface between said fluid communication path and said heavy crude oil or tar sand oil or bitumen-containing formation from said formation into said injected aqueous fluid moving within said formation along said aqueous fluid communication path and recovering the resulting produced heavy crude oil or tar sand oil or bitumen from said formation as an emulsion containing less than about 30% oil or bitumen via said production well or conduit.

30. A method in accordance with claim 29 wherein carbon dioxide is introduced into said formation together with said aqueous fluid stream.

31. A method in accordance with claim 29 wherein the amount of aqueous fluid introduced into said formation is increased so as to maintain a given or fixed or predetermined pressure differential between said injection well and said production well.

32. A method in accordance with claim 29 wherein the amount of aqueous fluid introduced into said formation is increased so as to increase the production of heavy crude oil or tar sand oil or bitumen from said formation.

33. A method in accordance with claim 31 wherein the amount of aqueous fluid introduced into said formation is adjusted so as to produce an emulsion containing said heavy crude oil or tar sand oil or bitumen wherein the amount of said heavy crude oil or tar sand oil or bitumen in said emulsion is 10–25% by weight or volume.

34. A method in accordance with claim 29 wherein a surfactant is introduced into said formation along with said aqueous fluid.

35. A method in accordance with claim 34 wherein said surfactant is a petroleum sulfonate.

36. A method in accordance with claim 35 wherein the amount of petroleum sulfonate introduced into said formation along with said aqueous fluid comprises a minor amount therein in the range 0.0001–0.5% by weight or volume.

37. A method in accordance with claim 29 wherein a minor amount of the resulting produced heavy crude oil or tar sand oil or bitumen recovered from said formation as an emulsion via said production well or conduit is recycled or returned as an oil-in-water emulsion to said formation via said aqueous fluid introduced into said formation via said injection well.

38. A method in accordance with claim 29 wherein a minor amount of the aqueous fluid produced with said heavy crude oil or tar sand oil or bitumen is returned or recycled to said formation.

39. A method in accordance with claim 29 wherein the temperature of said aqueous fluid introduced into said formation is increased to a temperature in the range 60°–180° C.

40. A method in accordance with claim 29 wherein said aqueous fluid is introduced into said formation at a temperature in the range 110°–180° C.

41. A method in accordance with claim 29 wherein said aqueous fluid contains sodium hydroxide dissolved therein an an amount to increase the pH of the injected aqueous fluid to a value in the range 9–13.

42. A method in accordance with claim 29 wherein sodium hydroxide and carbon dioxide are introduced into said formation along with said increased temperature aqueous fluid.

43. A method in accordance with claim 29 wherein the heavy crude oil or tar sand oil or bitumen is recovered from the emulsion produced from said formation via said production well or conduit.

44. A method in accordance with claim 29 wherein carbon dioxide is introduced into said formation together with said aqueous fluid stream to bring about and/or maintain the amount of said heavy crude oil or tar sand oil or bitumen in said produced emulsion in the range 20 to less than about 30% by weight or volume.

45. A method in accordance with claim 29 wherein surfactant is introduced into said formation together with said aqueous fluid stream to bring about and/or maintain the amount of said heavy crude oil or tar sand oil or bitumen in said produced emulsion in the range 20 to less than about 30% by weight or volume.

46. A method in accordance with claim 29 wherein sodium hydroxide and carbon dioxide are introduced into said formation along with said increased temperature aqueous fluid and wherein the carbon dioxide is introduced to bring about and/or maintain the amount of said heavy crude oil or tar sand oil or bitumen in said produced emulsion in the range 10–30% by weight or volume.

* * * * *